Oct. 31, 1967  E. B. WAGNER  3,349,931
TELESCOPING UNLOADING TRUCK
Filed Aug. 21, 1961  4 Sheets-Sheet 3
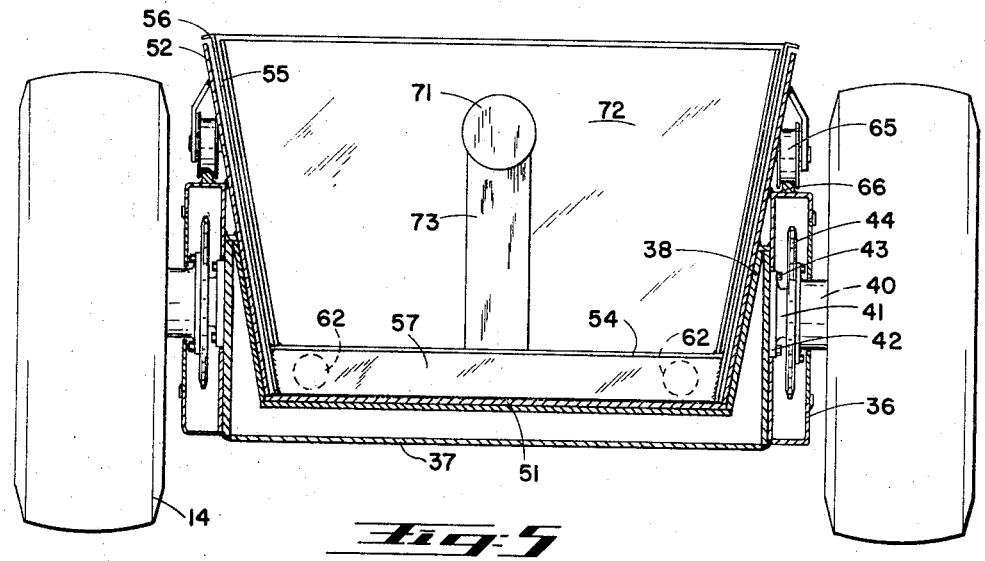
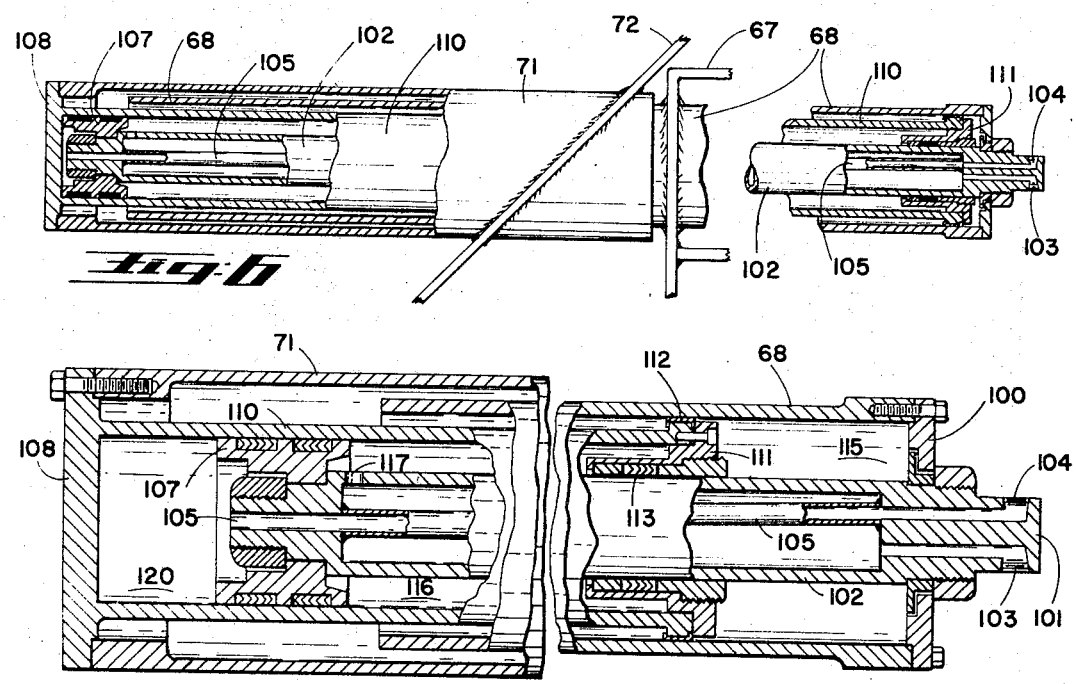
INVENTOR.
EDDIE B. WAGNER
BY
*Ln R. Schermerhorn*
ATTORNEY

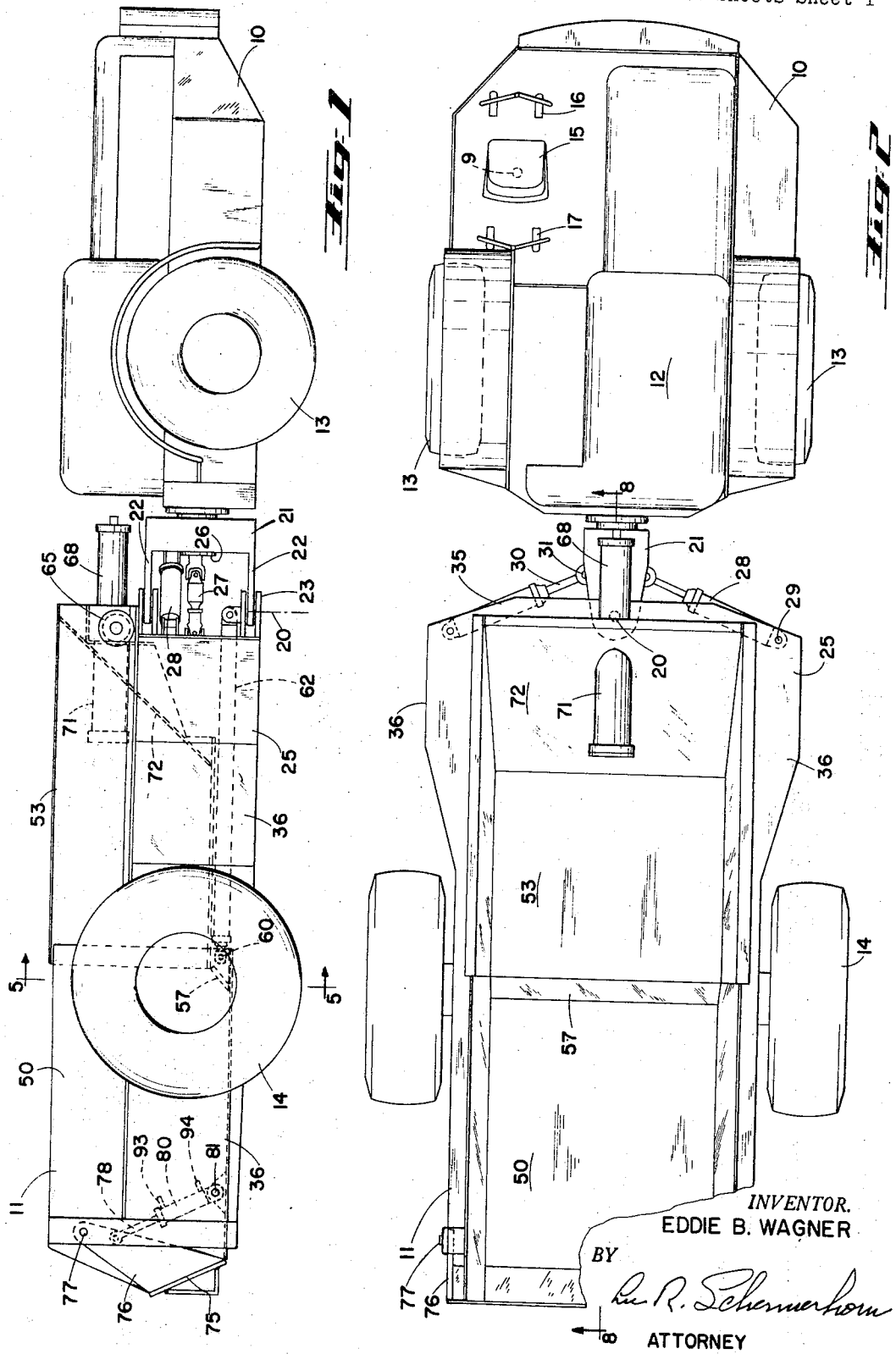

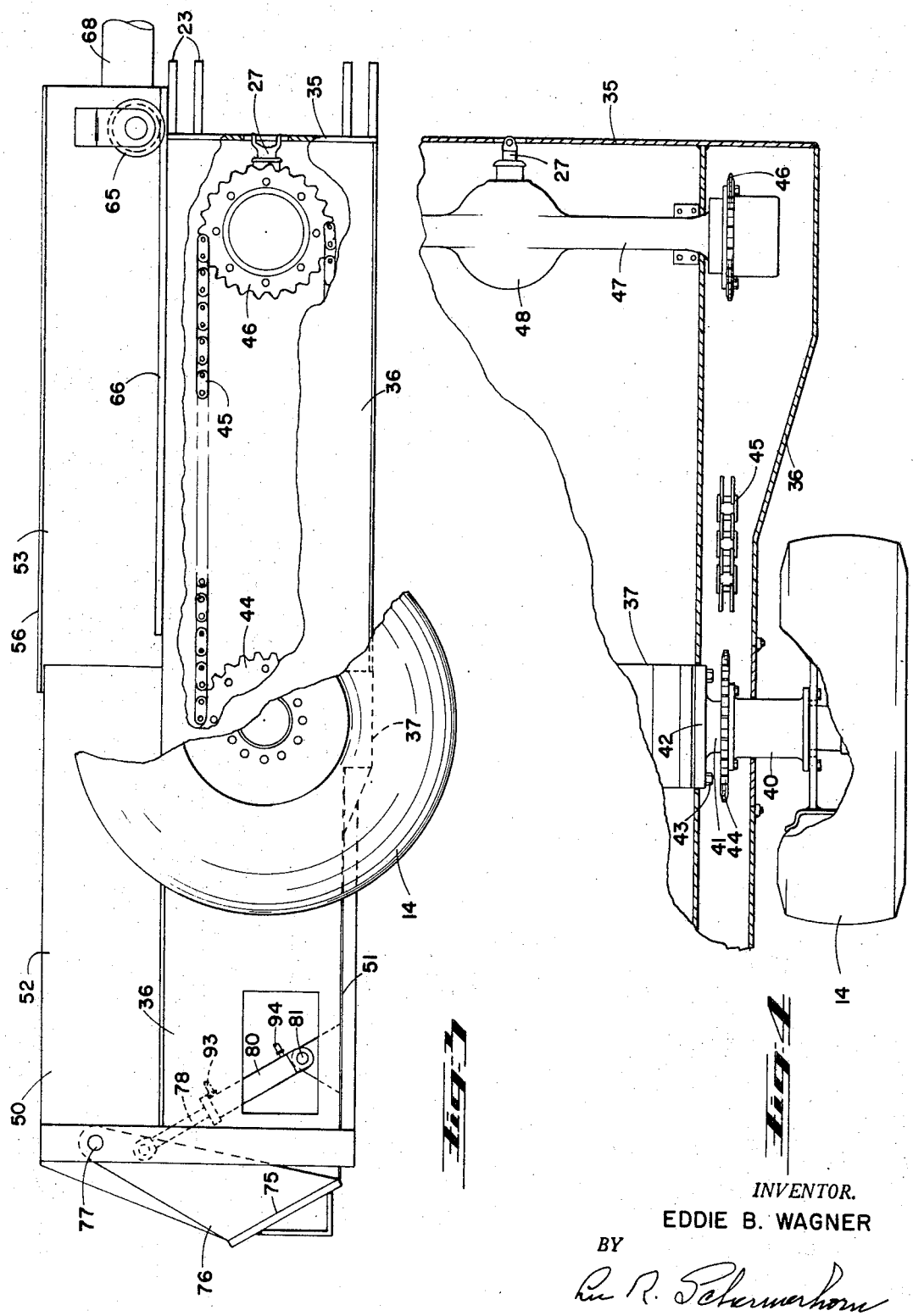

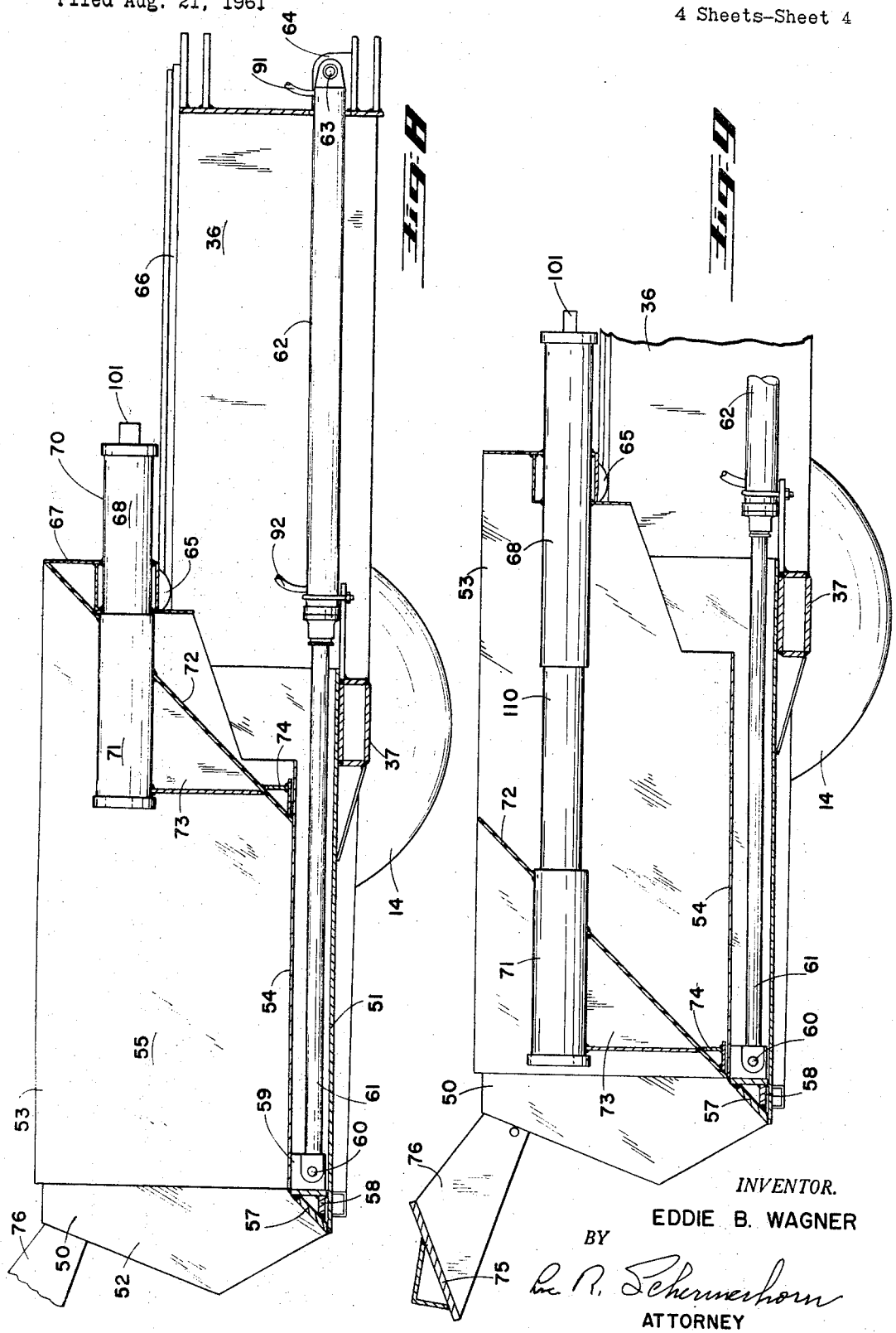

United States Patent Office 3,349,931
Patented Oct. 31, 1967

3,349,931
TELESCOPING UNLOADING TRUCK
Eddie B. Wagner, Portland, Oreg., assignor to Wagner Mining Scoop, Inc., Portland, Oreg., a corporation of Oregon
Filed Aug. 21, 1961, Ser. No. 132,724
14 Claims. (Cl. 214—82)

This invention relates to a self-unloading truck having body parts which telescope together to discharge a load out of the rear end of the body.

The invention is of particular advantage in mine trucks where the lack of overhead clearance may not permit dumping in the usual manner by tipping up the body for gravity discharge. Trucks in such use must have a low silhouette, they must be able to turn on a short radius and they must be able to carry and discharge heavy loads of high density material such as ore, rock and mud. Another requirement not common to trucks in general is that they must often travel long distances in reverse.

Objects of the invention are to provide an improved telescopic unloading truck, to provide a low hung and short turning mine truck which will carry and discharge heavy loads of ore and waste, to provide a truck having good visibility for the driver and good steering characteristics in reverse drive, to provide a truck which can be loaded and unloaded under a low ceiling, to provide self-cleaning telescopic body sections, to provide miscellaneous improved features of construction for such trucks and to impart greater ruggedness and durability with less maintenance and repair than are required of conventional trucks in such service.

The present truck is preferably built in two pivotally connected articulating units which steer by turning a two wheel motor unit relative to a two wheel body unit. This steering arrangement operates the same in forward and reverse travel which facilitates long hauls in reverse. The body unit comprises a rear fixed body section through which the load is discharged by rearward telescopic movement of a forward section or push gate. In a small truck the load is discharged by merely moving a push gate rearward through the fixed body section to the rear end thereof while in a larger truck there is a movable forward body section which first moves rearwardly to discharge half the load, followed by movement of a push gate within the front body section. The push gate preferably slopes rearwardly for final gravity discharge of all the body contents so that none of the load needs to be removed by hand.

The truck is preferably of the four-wheel drive type, the space under the inclined push gate being utilized for a differential axle in the power train to the rear wheels. The body is hung low between the two rear wheels which are mounted on stub axles projecting from hollow frame members which extend along opposite sides of the body. This position of the frame members allows them to be made quite deep in a vertical direction to impart adequate strength and rigidity. The hollow side frame members house chain drives from the differential axle to the rear wheels.

These chain drives are utilized to alter the drive ratio to the rear wheels which are preferably larger than the front wheels. The use of smaller front wheels provides not only an economy of manufacture but also better visibility for the driver when travelling in reverse.

The invention will be better understood and additional objects and advantages will become apparent from the following detailed description of the preferred embodiment illustrated in the accompanying drawings. Various changes may be made in the construction and arrangement of parts and certain features may be used without others. All such modifications within the scope of the appended claims are included in the invention.

In the drawings:
FIGURE 1 is a side elevation view of a truck embodying the principles of the invention;
FIGURE 2 is a top plan view of the truck;
FIGURE 3 is a side elevation view of the body unit with parts broken away to show the drive mechanism and other features;
FIGURE 4 is a fragmentary plan view of the body unit in FIGURE 3 with parts broken away;
FIGURE 5 is a cross sectional view taken on the line 5—5 of FIGURE 1;
FIGURE 6 is a view mostly in section and with parts broken away showing the telescoping cylinder unit for operating the push gate;
FIGURE 7 is an enlarged sectional view of the cylinder unit shown in FIGURE 6 with the parts in a different position;
FIGURE 8 is a longitudinal sectional view of the body unit taken on the line 8—8 of FIGURE 2 but showing the telescoping body sections in a first stage of unloading movement; and
FIGURE 9 is a view similar to FIGURE 8 showing the parts in the second stage of unloading movement.

Referring first to FIGURES 1 and 2, the truck comprises, generally, a motor unit 10 and a body unit 11. Motor unit 10 is equipped with a motor 12 for driving a pair of small front wheels 13 on the motor unit and a pair of large rear wheels 14 on the body unit. The motor unit is further equipped with an operator's seat 15 which is swivel mounted on a post 9. The seat will face forward for the use of one set of driving controls 16 in forward travel or face rearward for the use of another set of driving controls 17 in reverse travel. The motor unit has an open top whereby an operator in the seat 15 has a full view of the road over the adjacent front wheel while travelling in reverse. The highest part of the motor unit is the same height as the body unit.

The motor and body units are pivotally interconnected for steering by turning one unit relative to the other about a vertical axis 20 between the two units. An articulating connection is provided between the two units for this purpose and also for the purpose of accommodating relative roll movement between the two units on uneven ground. This connection comprises an articulating member 21 having rearwardly extending upper and lower horizontal ears 22. These ears project between pairs of forwardly extending horizontal ears 23 on the body frame 25. These ears are pivotally interconnected by upper and lower vertical pins, not shown, which define the pivot axis 20. Articulating member 21 is mounted for rotation on a rearwardly extending horizontal hollow trunnion 26 on the rear of motor unit 10. This articulating connection allows one unit to roll relative to the other about the horizontal longitudinal axis of trunnion 26 and allows the two units to pivot for steering about the vertical axis 20. A drive shaft 27 equipped with suitable universal joints extends through the center of hollow trunnion 26 to drive the rear wheels 14.

Steering is accomplished by a pair of hydraulic cylinders 28 pivotally connected at 29 with the frame 25. Each cylinder has a piston rod 30 pivotally connected at 31 with the articulating member 21. By extending one piston rod and retracting the other, the motor and body units are caused to pivot relative to each other about the vertical axis 20. This steering and driving arrangement causes the trailing wheels to follow approximately in the tracks of the leading wheels in turning corners which is advantageous in making sharp turns often necessary in mining work. This permits the use of a larger truck than in the usual case of a vehicle having steering wheels at one end.

The truck may be driven with substantially equal facility in either direction whereby there is no inconvenience to the operator when it is necessary to drive a considerable distance in reverse. When the mine does not allow space for turning points or where the turning points may be far apart, the truck may be driven in reverse as easily as forward.

Body frame 25 is U-shaped in plan view having a transverse front member 35 and a pair of longitudinal side members 36 extending from member 35 and to the rear end of the body unit. Each side member 36 is of hollow box construction, as shown in FIGURE 5, fabricated by welding together a plurality of steel plates. Interconnecting the side members 36 between the rear wheels 14 is a transverse hollow box axle beam 37 made in the same way. Axle beam 37 is U-shaped in elevation view with the outer vertical sides of its upright arms 38 welded to the inside plates of side frame members 36.

Referring now to FIGURE 4, each rear wheel 14 has a hub 40 mounted on a stub axle or spindle 41. Spindle 41 has a flange base 42 secured by bolts or screws 43 directly to an end of axle beam 37 through openings in the inside plate of side member 36. Hub 40 carries a sprocket 44 within the side member 36. Sprocket 44 is driven by a chain 45 from a driving sprocket 46 also within the side member 36. The driving sprockets 46 in opposite sides of the frame are mounted on the outer ends of half axles within an axle housing 47 which includes a conventional differential unit at 48. Differential 48 is driven by the longitudinal drive shaft 27.

This chain and sprocket drive provides convenient means for adjusting the driving ratio for the large rear wheels. Sprocket 46 has fewer teeth than sprocket 44 in the same ratio as the diameters of the front and rear wheels 13 and 14. This permits drive shaft 27 for the rear wheels to turn at the same speed as the drive shaft for the front wheels, not shown, the front wheels being interconnected by a similar differential unit. Thus, both differential units may be driven from a common power shaft from the motor notwithstanding the difference in wheel sizes. The smaller front wheels, which carry less weight, afford an economy of manufacture and provide the additional advantage of better visibility for the driver when traveling backward.

Referring now to FIGURES 3 and 5, the frame side members 36 carry a rear body section 50 rigid with the frame. This body section comprises a bottom wall 51 welded at its forward end on top of axle beam 37 below the level of wheel spindles 41 and a pair of sloping side walls 52. Side walls 52 are welded at their forward ends to the inside sloping surfaces of the upstanding arms 38 on the ends of the axle beam. This body section extends rearwardly to the rear ends of the frame side members 36 which support the rest of the body section.

Telescoped partially within rear body section 50 is a front body section 53 having a raised bottom wall 54 spaced a distance above bottom wall 51 of the rear section. Connected with the bottom wall 54 are sloping side walls 55 having top flanges 56 overhanging the top edges of the rear section side walls 52. Turning now to FIGURE 8, the rear edge of bottom wall 54 is equipped with a sloping scraper apron 57 secured to a cross member 58. These parts are arranged to slide on bottom wall 51 when the front body section moves within the rear body section.

The opposite end portions of cross member 58 are equipped with forwardly projecting apertured ears 59 for pins 60 in the ends of a pair of piston rods 61 which extend longitudinally between the stationary and movable bottom walls 51 and 54. Piston rods 61 are connected with pistons in double acting cylinders 62 which are connected at their forward ends by pins 63 with ears 64 on integral portions of the front transverse frame member 35. A full stroke of piston rods 61 carries the apron 57 substantially to the rear end of bottom plate 51 as shown in FIGURE 8. When the piston rods are retracted the front body section is pulled forward to its normal position shown in FIGURE 1. During this retracting movement cross member 58 scrapes the bottom wall 51 clean of any material that may have passed between the two body sections, discharging such material over the front edge of wall 51.

The upper forward end of front body section 53 is supported at its opposite sides by a pair of wheels 65 running on tracks 66 on top of the frame side members 36 as best shown in FIGURES 3 and 5. These wheels are mounted on a cross member 67 at the top of the front body section, best shown in FIGURES 8 and 9.

Rigidly mounted in the center of cross member 67 is the supporting front cylinder 68 of a double acting cylinder unit 70. A rear cylinder 71 on this unit is welded to a sloping push gate 72 for longitudinal travel within the front body section. A hollow box 73 of welded steel plate serves to rigidify the connection between cylinder 71 and the push gate and prevents material from wedging in the space under the cylinder. The upper end of push gate 72 in its forward limit of travel abuts cross member 67 of the front body section. The lower end of push gate 72 is equipped with a stiffening slide plate 74 which slides on front section bottom wall 54. When cylinder unit 70 is fully extended, the lower end of the push gate is at the rear end of bottom wall 54 as shown in FIGURE 9. In this position of the parts all the material discharges by gravity from the truck. Push gate 72 has sloping side edges to fit within side walls 55 as shown in FIGURE 5.

Tailgate 75 has a low upper edge as shown in FIGURE 3 for low level loading of the truck from the rear. The tailgate at its opposite ends is mounted on arms 76 to pivot about points 77 well above its upper edge. Arms 76 are connected with piston rods 78 to swing the tailgate upwardly and rearwardly away from the body in opening as shown in FIGURE 9. Piston rods 78 extend from cylinders 80 which are connected with frame side members 36 at 81.

The construction of push gate cylinder unit 70 is shown in FIGURES 6 and 7. This unit comprises a multiple concentric cylinder arrangement designed for lateral rigidity against bending to prevent the push gate from cocking to one side or the other in pushing a load out of the truck. Supporting cylinder 68 is equipped with a head 100 carrying the boss end 101 of a hollow piston rod 102. Boss 101 has a hydraulic connection 103 leading to the interior of piston rod 102 and a hydraulic connection 104 leading to an internal tube 105. Tube 105 opens through the opposite end of the piston rod. Mounted on the piston rod is a piston 107.

Push gate cylinder 71, which is the outermost cylinder, carries a head 108 which is common to an inner cylinder 110 containing the piston 107. The inner end of cylinder 110 carries an annular piston assembly 111 having an outer non-sealing guide ring 112 slidable inside of cylinder 68 and an inner packing ring 113 forming a seal against the outer surface of piston rod 102. This piston forms a non-working chamber 115 between cylinder 68 and piston rod 102 and an expansible working chamber 116 between piston rod 102 and cylinder 110. The latter chamber communicates with the interior of piston rod 102 through port 117. Cylinder 110 contains a second expansible working chamber 120 between piston 107 and head 108. The expansible chambers 116 and 120 operate the cylinder unit 20 in extension and retraction by switching hydraulic pressure applications at the hydraulic connections 103 and 104 to provide a long stroke with all the hydraulic connections at one end of the unit. During the movements of piston 111 air can enter and escape from chamber 115 around guide ring 112 which fits loosely in cylinder 68.

When hydraulic pressure is applied through connection 104, hydraulic fluid enters chamber 120 through tube 105 extending cylinders 71 and 110 to the left away from cylinders 68 and piston rod 102. During this movement hydraulic fluid is discharged from chamber 116 through port 117, the interior of piston rod 102 and connection 103. To retract the unit, hydraulic pressure is introduced through connection 103 to expand chamber 116. This draws cylinders 71 and 110 to the right, discharging hydraulic fluid from chamber 120 through tube 105 and connection 104. Cylinder 71 encloses and protects the moving parts from the material in the truck body.

During the initial push when the thrust is maximum in ejecting a load, the push gate is held rigid in a lateral direction by two widely spaced points of bearing between the relatively movable parts. The outer end of cylinder 110 is supported by piston 107 while its inner end is supported by cylinder 68. As the push gate moves rearward, these two points of support for the cylinder 110 move closer together but at the same time the load is discharging and all the applied stresses are being reduced. By the time the piston supports 107 and 111 approach each other, the thrust load has fallen to a minimum. Thus, the telescopic cylinder unit provides the greatest stiffness when it is needed most with the minimum stiffness occurring at the end point of no load. Also, it will be observed that expansible chamber 120 has a large piston area for moving the push gate under load while the chamber 116 has a small piston area for retracting the push gate under a load consisting merely of friction.

The motor unit 10 is equipped with a hydraulic pressure system and controls for operating the hydraulic cylinders in sequence. Movement of a manual control valve to a first unloading position admits hydraulic pressure to the forward ends of cylinders 62 through hydraulic connections 91 and the lower ends of double acting tail gate cylinders 80 through hydraulic connections 93. This opens the tail gate 75 and causes the forward body section 53 to move rearwardly through rear body section 50 ejecting the load from the latter. In FIGURE 8 this first unloading stage has been completed. A further movement of the manual control valve then admits hydraulic pressure also to the port 104 of push gate cylinder unit 70. This extends cylinder 71 and push gate 72 away from cylinder 68 to eject the remaining part of the load contained in front body section 53. FIGURE 9 shows the position of the parts when this second unloading stage has been completed.

In a third position of the control handle the hydraulic pressure application to push gate cylinder unit 70 is switched from connection 104 to 103 in FIGURE 7, causing push gate 72 to be retracted forward to its FIGURE 8 position. In a fourth position of the control valve fluid pressure application is switched from the forward to the rear ends of cylinders 62 through hydraulic connection 92 and from the lower to the upper ends of cylinders 80 through hydraulic connections 94 to close the tail gate and retract front body section 53 forward to its normal position shown in FIGURES 1 and 3.

This hydraulic actuating system utilizes conventional components and is not illustrated. Pressure accumulators are preferably incorporated in the pressure lines 94 which hold the tail gate open so that if the operator should back into an obstruction while the tail gate is open, the tail gate will be pushed closed, compressing the air in the accumulator without damaging the mechanism.

The application of thrust to the lower rear corners of front body section 53 has a desirable mechanical advantage in initiating the ejection of a load when the thrust is a maximum. With the upper front end of body section 53 supported on wheels 65, the rearward thrust of piston rods 61 produces an upward reaction at the rear end of body section 53 tending to lift the rear end of this section and rotate it about the axis of wheels 65. Actual lifting movement does not occur because of the weight of material holding the body section 53 down but the lifting component tends to reduce the friction between scraper apron 57 and the stationary bottom wall 51 to relieve binding and reduce wear and obviate the necessity for rollers in the bottom of the movable body section. This action is automatically self-compensating in that the uplifting force tends to increase with the resistance to movement and to decrease as the resistance to movement is diminished by the discharge of the load. For this reason the scraper apron 57 never lifts off the stationary bottom wall 51 but is always effective to scrape the bottom wall 51 clean in both directions of movement as above described.

In the retracting movement of piston rods 61 the uplift component is reversed to hold the scraper apron 57 and cross member 58 firmly against the bottom wall 51. This is desirable to keep the bottom wall 51 clean and prevent the parts 57, 58 from overriding any material that may tend to stick on the bottom wall. In the forward retracting movement of piston rods 61 the moving forces are relatively small whereby the downward force component which is effective at that time does not develop objectionable friction and wear on the bottom wall.

Having now described my invention and in what manner the same may be used, what I claim as new and desire to protect by Letters Patent is:

1. In a telescoping unloading truck, a frame having hollow longitudinal side members, a U-shaped axle beam having upstanding arms connected to said side members, wheel spindles mounted on said arms, ground wheels on said spindles having sprocket wheels in said side members, drive chains for said sprocket wheels in said side members, a rear body section having a bottom wall connected to said axle beam below the axis of said wheel spindles and having side walls connected to said axle beam arms and frame side members, a front body section having bottom and side walls telescoping within said rear section walls, and wheels on upper front portions of said front body section running on said frame side members.

2. In a telescoping unloading truck, a frame having hollow longitudinal side members, a U-shaped axle beam having upstanding arms connected to said side members intermediate the ends of the side members, wheel spindles mounted on said arms, ground wheels on said spindles having sprocket wheels in said side members, drive chains for said sprocket wheels in said side members, a rear body section having a bottom wall connected at its front end to said axle beam below the axis of said wheel spindles and having side walls connected to said axle beam arms and frame side members, said rear body section extending from said axle beam to the rear ends of said side members, a front body section having bottom and side walls telescoping within said rear section walls, tracks on top of said frame side members forward from said axle beam, and wheels on upper front end portions of said front body section running on said tracks.

3. In a telescoping unloading truck, a frame having hollow longitudinal side members, ground wheels mounted outside of said side members, chain and sprocket wheel drive means for said ground wheels housed in said side members, a rear body section fixedly mounted between said side members of said frame and with its bottom wall below the axis of said wheels, a front body section arranged to telescope rearwardly into said rear body section, a cross member on the front end of said front body section, tracks on top of said side members, wheels on the ends of said cross member running on said tracks, a push gate in the front end of said front body section, and a piston and cylinder unit connected between said cross member and said push gate.

4. In a telescoping unloading truck, a body section having a front end cross member, a push gate in said front end of said body section, a cylinder extending rearwardly through said push gate and fixedly secured at its front end to said push gate, a second cylinder concentric within said first cylinder, said two cylinders having a common head at their rear ends whereby they are integrally connected together, a third cylinder concentric between said first and second cylinders and fixedly secured at midlength to said cross member, a head on the front end of said third cylinder, a hollow piston rod on said third cylinder head having a piston in said second cylinder, a fluid conduit extending through said piston rod and piston, a fluid conduit through said piston rod to the space between said piston rod and second cylinder, an annular piston on the front end of said second cylinder in sealing and sliding engagement with said piston rod, and a guide ring on the front end of said second cylinder in sliding engagement with said third cylinder.

5. A telescoping unloading truck comprising a frame, a rear body section having bottom and side walls, a front body section having bottom and side walls telescoping within said rear section walls, said front section bottom wall being spaced above said rear section bottom wall, wheels supporting the upper front end portion of said front body section for longitudinal movement on said frame, cylinder and piston units connected with the rear end of said front section bottom wall and operable in the space between said bottom walls for moving said front section rearwardly into said rear section to discharge a load, a push gate in the front end of said front body section, and a cylinder and piston unit connected between said front body section and said push gate for moving said push gate rearward in said front body section.

6. A truck comprising a body unit adapted for connection to a motor unit, a U-shaped frame of substantial depth supporting said body unit, said frame having a front transverse member and hollow longitudinal box beam side members, ground wheels having stub axles extending through said frame side members, a differential axle mounted behind said front frame member, a drive shaft to said differential axle, sprocket wheels on said differential axle and ground wheels in said frame side members, drive chains on said sprocket wheels housed in said frame side members, a rear body section having bottom and side walls mounted between said side members of said frame with said bottom wall below said stub axles, a front body section between said side members of said frame having bottom and side walls telescoping within said rear section walls, said front section bottom wall being spaced above said rear section bottom wall, piston rods connected with the rear end of said front section bottom wall and operable in the space between said bottom walls to pull said front section rearwardly into said rear section to discharge the load in said rear section, cylinders for said piston rods connected with the front end of said frame, a sloping push gate in the front end of said front body section inclined over said differential axle, and a cylinder and piston connected between said push gate and the front end of said front body section to move said push gate rearwardly into said front body section to discharge a load from said front body section.

7. A telescoping unloading truck comprising a frame having a pair of longitudinal side members, a rear body section in said frame having bottom and side walls, a front body section having bottom and side walls telescoping within said rear section walls, said front section bottom wall being spaced above said rear section bottom wall, a scraper apron depending from the rear edge of said front section bottom wall to scrape said rear section bottom wall, a pair of longitudinal cylinders anchored to said frame, pistons in said cylinders having piston rods connected to said rear edge of said front section bottom wall and operable in the space between said bottom walls for moving said front section rearwardly into said rear section to discharge a load, and wheels supporting the front end of said front body section for travel on said frame side members above the level of said piston rods so that the rearward thrust of said piston rods produces an upward component of force against the rear end of said front body section to reduce the sliding friction between said body sections.

8. A truck comprising a two wheel body unit, a U-shaped frame supporting said body unit on said two wheels, said frame having a front transverse member and hollow longitudinal box beam side members, forwardly extending horizontal apertured ears on said front transverse member arranged for vertical pin connection with a motor unit, a body having a bottom wall and a front end wall sloping rearwardly behind said front transverse frame member, axle spindles for said wheels projecting from said frame side members above the level of the bottom wall of said body, a differential axle mounted behind said front frame member in the space beneath said sloping front wall, a drive shaft to said differential extending forward through said front transverse frame member for operation by said motor unit, sprocket wheels on said differential axle and wheels in said frame side members, and drive chains on said sprocket wheels housed in said frame side members.

9. A telescoping unloading truck comprising a front body section arranged to telescope within a rear body section, a frame having side members extending longitudinally along opposite sides of said body sections and having top edges on a level intermediate the vertical extent of said body sections, wheels on the upper front end portion of said front body section running on said top edges of said frame side members for said telescoping movement, said front body section having a bottom spaced above the bottom of said rear body section, longitudinal cylinders anchored to said frame, and pistons in said cylinders having piston rods between the bottoms of said two body sections connected to the rear end of said front body section so that the rearward thrust of said piston rods produces a substantial upward thrust component on said rear end of said front body section to reduce the sliding friction between said body sections in said telescoping movement.

10. A car for handling ore and like materials which comprises a body structure including a material-carrying trough member extending approximately one half the length of the body structure, the trough member being disposed at the rear of the body structure and fixed thereto, a movable trough member disposed within the fixed trough member, power operated mechanism for moving the movable trough member lengthwise of the body structure to increase the capacity of the ore car and for partially discharging the load at the rear of the fixed trough member, a power operated pusher plate reciprocable within the movable trough member for clearing the movable trough member, a pair of wheels for the ore car, means for operating the movable trough member and the pusher plate independently of each other, stub axles for the wheels projecting from the respective sides of the body structure above the bottom of the trough members, and a coupling device at the front of the body structure for connection to a towing tractor.

11. A car for handling ore and like materials as set forth in claim 10 wherein the body structure is closed by a bottom plate extending between the front end of the fixed trough member and the front end of the movable trough member and wherein the movable trough member is operated by two hydraulic cylinders disposed between such plate and the bottom of the movable trough member, each of said cylinders being secured to said plate and each having piston rods at their ends, these rods being operatively connected to the rear end of the movable trough member.

12. A car for handling ore and like materials as set forth in claim 11 wherein a plow element is mounted on the rear edge of the bottom of the movable trough member, the bottom plate of the body structure being disposed below the level of the bottom of the fixed trough member and the piston rods of the hydraulic cylinder being connected to the movable trough member in horizontal alignment with the plow element.

13. A car for handling ore and like materials as set forth in claim 10 wherein a hydraulic cylinder is arranged to operate the pusher plate, the cylinder being mounted in fixed position at the front end of the movable trough member, a plunger operating within the cylinder and operatively connected with the pusher plate to partially support the same, and the pusher plate having a plow element at its lower edge resting upon the bottom of said movable trough member, the plow element serving to assist the cylinder in supporting the pusher plate and to clear the material from the movable trough member.

14. A car for handling ore and like materials which comprises a body structure including a material-carrying trough member extending approximately one half the length of the body structure, the trough member being disposed at the rear of the body structure and fixed thereto, a movable trough member of similar cross section and disposed within the fixed trough member, a rail secured at each side of the body structure and extending from the fixed trough member toward the front of the body structure, a pair of wheels mounted one at each side of the movable trough member and supported on the rails, means for moving the movable trough member forwardly within the fixed trough member to enlarge the capacity of the car and for moving it rearwardly to discharge material at the rear of the fixed trough member, a pusher plate forming the front wall of the movable trough member and arranged to slide therewithin, means for moving the pusher plate lengthwise of the movable trough member to discharge material therefrom at the rear of the fixed trough member, and a plow member fixed to the rear of the movable trough member and slidable on the bottom of the fixed trough member, such plow member cooperating with the wheels and rails in supporting the movable trough member and serving to clear the material from the fixed trough member during the rearward discharge movement of the movable trough member.

References Cited
UNITED STATES PATENTS

| | | |
|---|---|---|
| 2,219,533 | 10/1940 | Ross. |
| 2,493,236 | 1/1950 | Dunstan. |
| 2,494,013 | 1/1950 | Tapp _____ 214—83.24 |
| 2,663,439 | 12/1953 | Phelps _____ 214—83.24 |
| 2,811,231 | 10/1957 | McCallum et al. ____ 180—72 X |
| 2,884,083 | 4/1959 | McColl _____ 180—12 |
| 2,913,061 | 11/1959 | Beyerstedt et al. _____ 180—12 |
| 3,007,589 | 11/1961 | Galloway _____ 214—82 |
| 3,021,968 | 2/1962 | Meyers _____ 214—82 |

GERALD M. FORLENZA, Primary Examiner.

PHILIP ARNOLD, EDWARD A. FALLER,
 HUGO O. SCHULZ, R. G. SHERIDAN, Examiners.

J. O. HARRELL, Assistant Examiner.